J. BERGSTEN.
CASING HEAD PACKER.
APPLICATION FILED MAY 29, 1916.

1,192,157.

Patented July 25, 1916.

Inventor
John Bergsten,
By C. L. Parker
Attorney

UNITED STATES PATENT OFFICE.

JOHN BERGSTEN, OF TAFT, CALIFORNIA.

CASING-HEAD PACKER.

1,192,157.

Specification of Letters Patent.

Patented July 25, 1916.

Application filed May 29, 1916. Serial No. 100,590.

*To all whom it may concern:*

Be it known that I, JOHN BERGSTEN, a citizen of the United States, residing at Taft, in the county of Kern and State of California, have invented certain new and useful Improvements in Casing-Head Packers, of which the following is a specification.

My invention relates to improvements in casing head packers, ordinarily used in oil wells.

An important object of the invention is to provide apparatus of the above mentioned character which is of simplified construction and is convenient in use.

Other objects and advantages of the invention will be apparent during the course of the following description.

Figure 1:
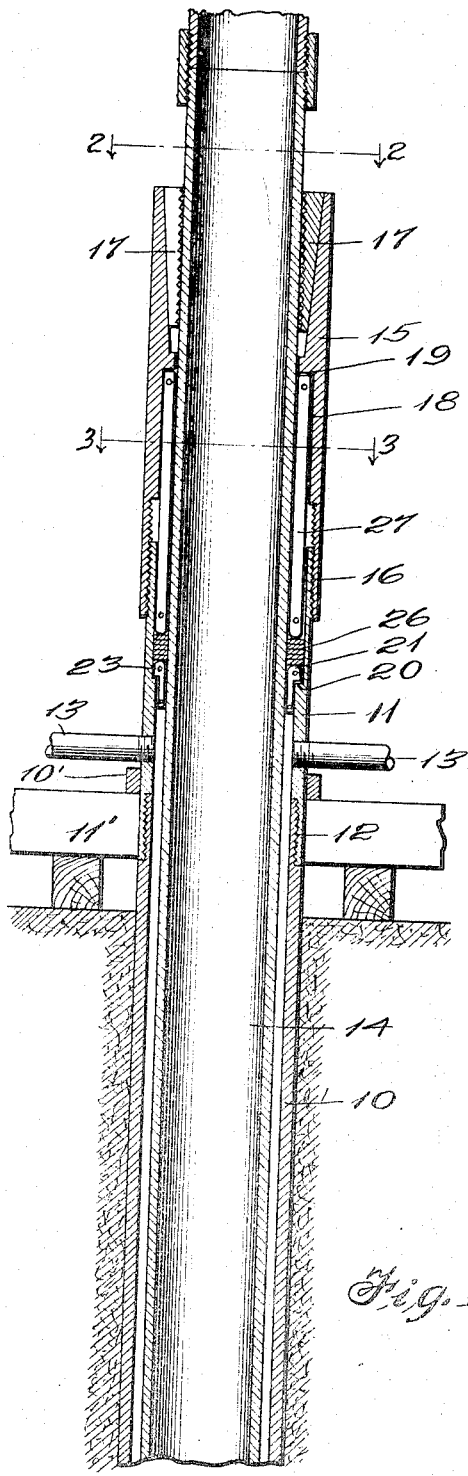
Figure 2:
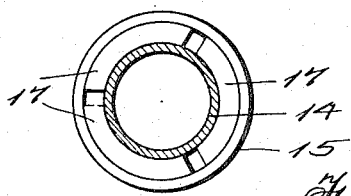
Figure 3:
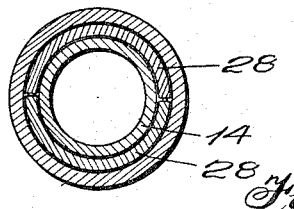
Figure 4:
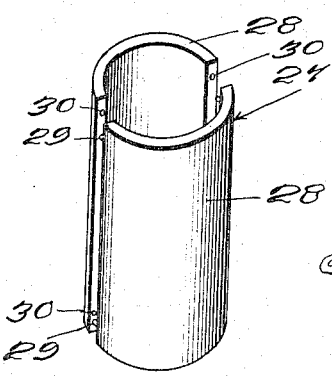
Figure 5:
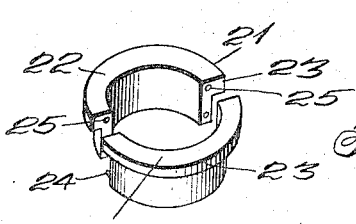

In the accompanying drawings forming a part of this specification and in which like numerals are employed to designate like parts throughout the same, Figure 1 is a central longitudinal sectional view through apparatus embodying the invention, Fig. 2 is a horizontal sectional view taken on line 2—2 of Fig. 1, Fig. 3 is a similar view taken on line 3—3 of Fig. 1, Fig. 4 is a perspective view of a compression element, and, Fig. 5 is a similar view of a packing supporting element.

In the drawings, wherein for the purpose of illustration is shown a preferred embodiment of my invention, the numeral 10 designates an outer or line casing, adapted for insertion within the bore of the well, with its upper end having screw-threaded engagement with a tubular supporting coupling 11, as shown at 12. This tubular supporting coupling has a ring 10', rigidly secured thereto, which rests upon a support 11', thus preventing the downward movement of the coupling 11. This tubular coupling is provided with gas draw-off pipes 13, communicating with the interior thereof. The pipes 13 may be equipped with valves (not shown). Extending longitudinally within the casing 10 is an inner tube 14, through which the oil is withdrawn from the well.

The numeral 15 designates a casing-head, having screw-threaded engagement with the supporting coupling 11, as shown at 16. The upper end of the casing head 15 has its bore tapered and decreasing in diameter downwardly, and its tapered portion receives segments or wedges 17, the inner faces of which have teeth to clamp or grip the tube 14, thus supporting it against dowhward movement. The supporting coupling 11 and casing head 15 have their bore enlarged, forming a chamber 18, and shoulders 19 and 20, as shown.

The numeral 21 designates a packing supporting ring, preferably formed in two parts or segments 22, provided with flanges 23. These flanges engage upon the shoulder 20. One part 22 carries pins 24 adapted to extend within openings 25 formed in the other part 22.

The numeral 26 designates packing, arranged upon the device 21 and surrounding the tube 14, to prevent the escape of gases.

Arranged above the packing 26 is a compression element or sleeve 27, preferably formed in two parts 28, one of which carries pins 29, to fit in openings 30 formed in the other part. The compression element 28 is inserted within the recess 18 and engages the packing 26 and the shoulder 19.

The outer casing 10 is lowered into the bore of the well in the usual manner and partly supported by contact with the wall of the bore and by the supporting casing 11, held against downward movement by the support 11'. The tube 14, which may be temporarily supported by suitable hoisting mechanism, is now lowered into the casing 10, to the desired position. The segments or wedges are now placed in the upper end of the bore of the casing head 15 and will support the tube 14. When it is desired to compress the packing 26 the casing head 15 is rotated for further screwing the same up upon the supporting casing 11, thus bringing the upper end of the compression element 27 in contact with the shoulder 19. Downward pressure from the casing head is thus transmitted to the packing 26 through the compression element 27. It is obvious that the gas or gases within the casing 10 will escape through the pipes 13 but cannot pass by the packing 26.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. In apparatus of the character described, an outer casing having an interior shoulder, a gas take off pipe connected with the outer casing, a casing head having screw-threaded engagement with the outer casing and provided with an interior shoulder and having a portion of its bore tapered, a tube extending longitudinally within the outer casing and casing head, tapered wedges arranged within the tapered bore of the casing head and contacting with the inner tube to hold it against downward movement, packing surrounding the tube and supported by the lower shoulder formed upon the outer casing, and a compression sleeve surrounding the tube and resting upon the packing and adapted to contact with the shoulder of the casing head whereby the weight of the tube may be transmitted to the packing by rotation of the casing head.

2. In apparatus of the character described, an outer casing having an interior shoulder, a gas draw off pipe connected with the outer casing, means for supporting the outer casing against downward movement, a casing head having screw-threaded engagement with the outer casing and provided with an interior shoulder and having a portion of its bore tapered, a tube extending longitudinally within the outer casing and casing head, wedges arranged within the tapered portion of the bore of the casing head and contacting with the tube to prevent its downward movement, a packing supporting ring arranged within the outer casing and engaging the shoulder thereof, packing arranged upon the packing supporting ring, and a compression sleeve surrounding the tube and resting upon the packing and having its upper end adapted to contact with the shoulder of the casing head so that the weight of the tube may be transmitted to the packing by the turning of the casing head.

3. In apparatus of the character described, an outer casing, a tubular coupling having screw-threaded engagement therewith and provided with an interior shoulder, a gas draw off pipe connected with the tubular coupling, means to support the tubular coupling against downward movement, a casing head having screw-threaded engagement with the tubular coupling and provided with an interior shoulder and having a portion of the bore tapered, a tube extending longitudinally within the outer casing and casing head, wedges arranged within the tapered portion of the bore of the casing head and having clamping engagement with the tube to prevent its downward movement, a packing supporting ring arranged within the outer casing and supported by the shoulder thereof, packing supported by the ring, and a compression sleeve surrounding the tube and resting upon the packing and having its upper end adapted to contact with the shoulder of the casing head whereby the weight of the tube may be transmitted to the packing.

In testimony whereof I affix my signature in presence of two witnesses.

JOHN BERGSTEN.

Witnesses:
CHARLES DEL BONDIO,
EDW. CRONK.